US007174326B2

(12) United States Patent
Ireland et al.

(10) Patent No.: US 7,174,326 B2
(45) Date of Patent: Feb. 6, 2007

(54) DATABASE SYSTEM PROVIDING METHODOLOGY FOR PREPARED STATEMENT CLONING

(75) Inventors: Evan P. Ireland, Khandallah (NZ); David L. Clegg, Altadena, CA (US); Joshua Meckler, San Francisco, CA (US)

(73) Assignee: Sybase, Inc., Dublin, CA (US)

( * ) Notice: Subject to any disclaimer, the term of this patent is extended or adjusted under 35 U.S.C. 154(b) by 414 days.

(21) Appl. No.: 10/707,852

(22) Filed: Jan. 16, 2004

(65) Prior Publication Data
US 2005/0015356 A1    Jan. 20, 2005

Related U.S. Application Data

(60) Provisional application No. 60/481,104, filed on Jul. 17, 2003.

(51) Int. Cl.
*G06F 17/30* (2006.01)
(52) U.S. Cl. .............. 707/2; 707/4; 707/3; 707/10; 707/205; 707/206
(58) Field of Classification Search ........... 707/2–4, 707/101, 104, 10, 205–206; 715/505, 513
See application file for complete search history.

(56) References Cited

U.S. PATENT DOCUMENTS

| 6,115,703 A * | 9/2000 | Bireley et al. ............. 707/2 |
| 6,446,062 B1 * | 9/2002 | Levine et al. .............. 707/3 |
| 6,598,058 B2 * | 7/2003 | Bird et al. ............... 707/201 |
| 6,985,904 B1 * | 1/2006 | Kaluskar et al. .......... 707/101 |
| 2003/0236780 A1 * | 12/2003 | Saha et al. ............... 707/3 |

OTHER PUBLICATIONS

Gosling, J. et al., Java Language Specification, 2nd Ed. (Chapters 1-5), Sun Microsystems, Inc., Mountain View, CA, Jun. 2000.
Gosling, J. et al., The Java Language Environment; A White Paper, Sun Microsystems, Inc., Mountain View, CA, Oct. 1995.
Sun Microsystems, JDBC 3.0 Specification, Final Release, Sun Microsystems, Inc., Mountain View, CA, Dec. 1, 2001 CT.

* cited by examiner

*Primary Examiner*—Cam-Y Truong
(74) *Attorney, Agent, or Firm*—John A. Smart; G. Mack Riddle (57) ABSTRACT

A method for cloning of prepared statements for execution against a database is described. In one embodiment, for example, a method for executing a database statement comprises steps of: preparing at least one template for execution of a statement against a database; storing the at least one template in a shared cache available to a plurality of database connections; in response to a request to execute a particular statement on a given database connection, determining whether a template for the particular statement is available in the shared cache; if the template is available in the shared cache, creating a database statement based on the template for execution on the given database connection; and executing the database statement on the given database connection.

36 Claims, 6 Drawing Sheets

DATABASE SYSTEM PROVIDING METHODOLOGY FOR PREPARED STATEMENT CLONING

CROSS REFERENCE TO RELATED APPLICATIONS

The present application is related to and claims the benefit of priority of the following commonly-owned, presently-pending provisional application(s): application Ser. No. 60/481,104, filed Jul. 17, 2003, entitled "Database System Providing Methodology for Prepared Statement Cloning", of which the present application is a non-provisional application thereof. The disclosure of the foregoing application is hereby incorporated by reference in its entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, created: Jan. 8, 2004, 11:54 am, size: 10.4 KB; Object ID: File No. 1; Object Contents: Source Code.

BACKGROUND OF INVENTION

1. Field of the Invention

The present invention relates generally to information processing environments and, more particularly, to improved methods for fast cloning of prepared statement objects in a data processing system, such as a database management system (DBMS).

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level.

DBMS systems have long since moved from a centralized mainframe environment to a de-centralized or distributed environment. Today, one generally finds database systems implemented as one or more PC "client" systems, for instance, connected via a network to one or more server-based database systems (e.g., application server and/or SQL database server). Commercial examples of these "client/server" systems include Powersoft® clients connected to one or more Sybase® Adaptive Server® Enterprise database servers. Both Powersoft® and Sybase® Adaptive Server® Enterprise are available from Sybase, Inc. of Dublin, Calif. The general construction and operation of database management systems, including "client/server" relational database systems, is well known in the art. See e.g., Date, C., "An Introduction to Database Systems, Seventh Edition", Addison Wesley, 2000, the disclosure of which is hereby incorporated by reference.

In recent years, this distributed environment has shifted from a standard two-tier client/server environment to a three-tier client/server architecture. This newer client/server architecture introduces three well-defined and separate processes, each typically running on a different platform. A "first tier" provides the user interface, which runs on the user's computer (i.e., the client). The first tier (or client) for many three-tier systems is accessing the second-tier application server through the Internet, typically using a Web browser, such as Netscape Navigator or Microsoft Internet Explorer. Next, a "second tier" provides the functional modules that actually process data. This middle tier typically runs on a server, often called an "application server". A "third tier" furnishes a database management system (DBMS) that stores the data required by the middle tier. This tier may run on a second server called the "database server" which communicates with the application server.

A simple, traditional database application typically creates one connection to a database that is used for each session of an application. However, many database applications (e.g., Web-based database applications) may need to open and close a new connection several times during the application's use. In this type of environment, connection pooling is often used for increased efficiency. Connection pooling involves maintaining a pool ("connection pool") of open database connections and managing connection sharing across different client requests to improve system performance and to reduce the number of idle connections. In response to each connection request, the connection pool first determines if there is an idle connection in the pool. If an idle connection is in the pool, the connection pool returns that connection instead of making a new connection to the database. In a multiple-tier client/server application environment, an application server (or a multi-threaded database client) process frequently maintains this type of connection pool for increased efficiency in accessing the database server.

An application server or a client process may also maintain a set of "prepared statements" that are frequently executed against the database server. A prepared statement is an object that represents a precompiled SQL statement. A prepared statement object can be used to efficiently execute the SQL statement against a database multiple times. In a database client process (e.g., a process on an application server) which keeps a pool of open database connections and frequently executes database prepared statements against a database server, the CPU utilization of the application server and the database server can be high as a result of the repeated creation of prepared statement objects. The usual solution is for the database client process (e.g., on the application server) to retain, for each pooled connection, a private cache of prepared statement objects so that with luck, when a statement is to be executed on a given connection, a suitable prepared statement object can be found in the connection's private cache, and re-used. For example, the prepared statement caching technique is described in U.S. Pat. No. 6,115,703 to Bireley, et al., the disclosure of which is hereby incorporated by reference for all purposes.

A disadvantage of this prepared statement caching approach is that it may utilize a significant amount of memory. For example, if there are M number of pooled connections, and N distinct statements that might be executed, the memory utilization of the above approach is proportional to M×N. Where either the number of pooled connections (M) or the number of distinct statements (N) that might be executed is large (or if both are large), this can result in excessive memory utilization within the database client process. It should be noted that for purposes of the following discussion the database client process may include a multi-threaded client connected directly to the database server as well as the more typical situation involving a middle-tier application server or Web server which maintains a pool of connections to the database server.

One current approach for addressing these memory utilization problems is to define a per-connection prepared statement cache size (L, where L<N), such that at most L prepared statement objects will be retained in each connection's private cache. However, one result of this approach is that some statements are not in the cache and must be re-prepared when they are to be executed. Thus, the primary goal of reducing CPU utilization may not be achieved as effectively as was at first envisaged (particularly if the ratio L/N is too high). This turns the problem into a classical space/time tradeoff.

What is needed is an alternative to prepared statement caching that has reduced memory utilization. Ideally, the solution should simultaneously reduce both CPU and memory utilization within a database client process, as compared with the usual approach of prepared statement caching. The present invention provides a solution for these and other needs.

SUMMARY OF INVENTION

A method for cloning of prepared statements for execution against a database is described. In one embodiment, for example, a method of the present invention is described for executing a database statement, the method comprises steps of: preparing at least one template for execution of a statement against a database; storing the at least one template in a shared cache available to a plurality of database connections; in response to a request to execute a particular statement on a given database connection, determining whether a template for the particular statement is available in the shared cache; if the template is available in the shared cache, creating a database statement based on the template for execution on the given database connection; and executing the database statement on the given database connection.

In another embodiment, for example, a system of the present invention is described for executing a database statement, the system comprises: at least one template comprising an executable structure for execution of a statement against a database; a shared cache for storing the at least one template attached to a first connection; a locater module for locating a template corresponding to a particular statement in the shared cache in response to a request to execute the particular statement on a second database connection; a cloning module for cloning the template to create a database statement for execution on the second database connection; and an execution module for executing the database statement on the second database connection.

In yet another embodiment, for example, a method of the present invention is described for executing a prepared statement against a database, the method comprises steps of: generating a prepared statement comprising an executable structure for a particular statement to be executed against the database; attaching the prepared statement to a first connection to the database; in response to a request to execute the particular statement on a second connection to the database, cloning the prepared statement for execution on the second connection; and executing the prepared statement against the database on the second connection.

DETAILED DESCRIPTION

Glossary

The following definitions are offered for purposes of illustration, not limitation, in order to assist with understanding the discussion that follows.

Java: Java is a general purpose programming language developed by Sun Microsystems. Java is an object-oriented language similar to C++, but simplified to eliminate language features that cause common programming errors. Java source code files (files with a .java extension) are compiled into a format called bytecode (files with a .class extension), which can then be executed by a Java interpreter. Compiled Java code can run on most computers because Java interpreters and runtime environments, known as Java virtual machines (VMs), exist for most operating systems, including UNIX, the Macintosh OS, and Windows. Bytecode can also be converted directly into machine language instructions by a just-in-time (JIT) compiler. Further description of the Java Language environment can be found in the technical, trade, and patent literature; see e.g., Gosling, J. et al., "The Java Language Environment: A White Paper", Sun Microsystems Computer Company, October 1995, the disclosure of which is hereby incorporated by reference. See also e.g., "Java 2 SDK, Standard Edition Documentation, version 1.4.2", from Sun Microsystems, the disclosure of which is hereby incorporated by reference. A copy of this documentation is available via the Internet (e.g., currently at java.sun.com/j2se/1.4.2/docs/index.html).

JDBC: JDBC is an application-programming interface (API) that provides database access from the Java programming language. JDBC allows Java applications to access multiple database management systems. A set of interfaces is included in the standard JDBC API for opening connections to databases, executing SQL commands, and processing results. Each relational database management system usually requires a driver to implement these interfaces. A JDBC driver manager typically handles multiple drivers that connect to different databases. Accordingly, JDBC calls are generally sent to the JDBC driver manager, which passes the call to the driver for interacting with the specified database. For further information on JDBC, see e.g., "JDBC 3.0 API Documentation", from Sun Microsystems, the disclosure of which is hereby incorporated by reference. A copy of this documentation is available via the Internet (e.g., currently at java.sun.com/products/jdbc/download.html#corespec30).

Prepared Statement: A "Prepared Statement" is an object that represents a precompiled SQL statement. A SQL statement is precompiled and stored in a "Prepared Statement" object. The Prepared Statement object can then be used to efficiently execute the SQL statement against a database multiple times. For further description of Prepared Statements in a Java language environment, see e.g., "Java 2 SDK, Standard Edition Documentation, version 1.4.2", from Sun Microsystems, the disclosure of which is hereby incorporated by reference. A copy of this documentation is available via the Internet (e.g., currently at java.sun.com/j2se/1.4.2/docs/index.html).

SQL: SQL stands for Structured Query Language, which has become the standard for relational database access, see e.g., "Information Technology—Database languages—SQL", published by the American National Standards Institute as American National Standard ANSI/ISO/IEC 9075: 1992, the disclosure of which is hereby incorporated by reference. For additional information regarding SQL in database systems, see e.g., Date, C., "An Introduction to Database Systems, Seventh Edition", Addison Wesley, 2000, the disclosure of which is hereby incorporated by reference.

Thread: A thread refers to a single sequential flow of control within a program. Operating systems that support multi-threading enable programmers to design programs whose threaded parts can execute concurrently. In some systems, there is a one-to-one relationship between the task and the program, but a multi-threaded system allows a program to be divided into multiple tasks. Multi-threaded programs may have several threads running through different code paths simultaneously.

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Computer-Based Implementation

Basic System Hardware (e.g., for Desktop and Server Computers)

Figure 1:
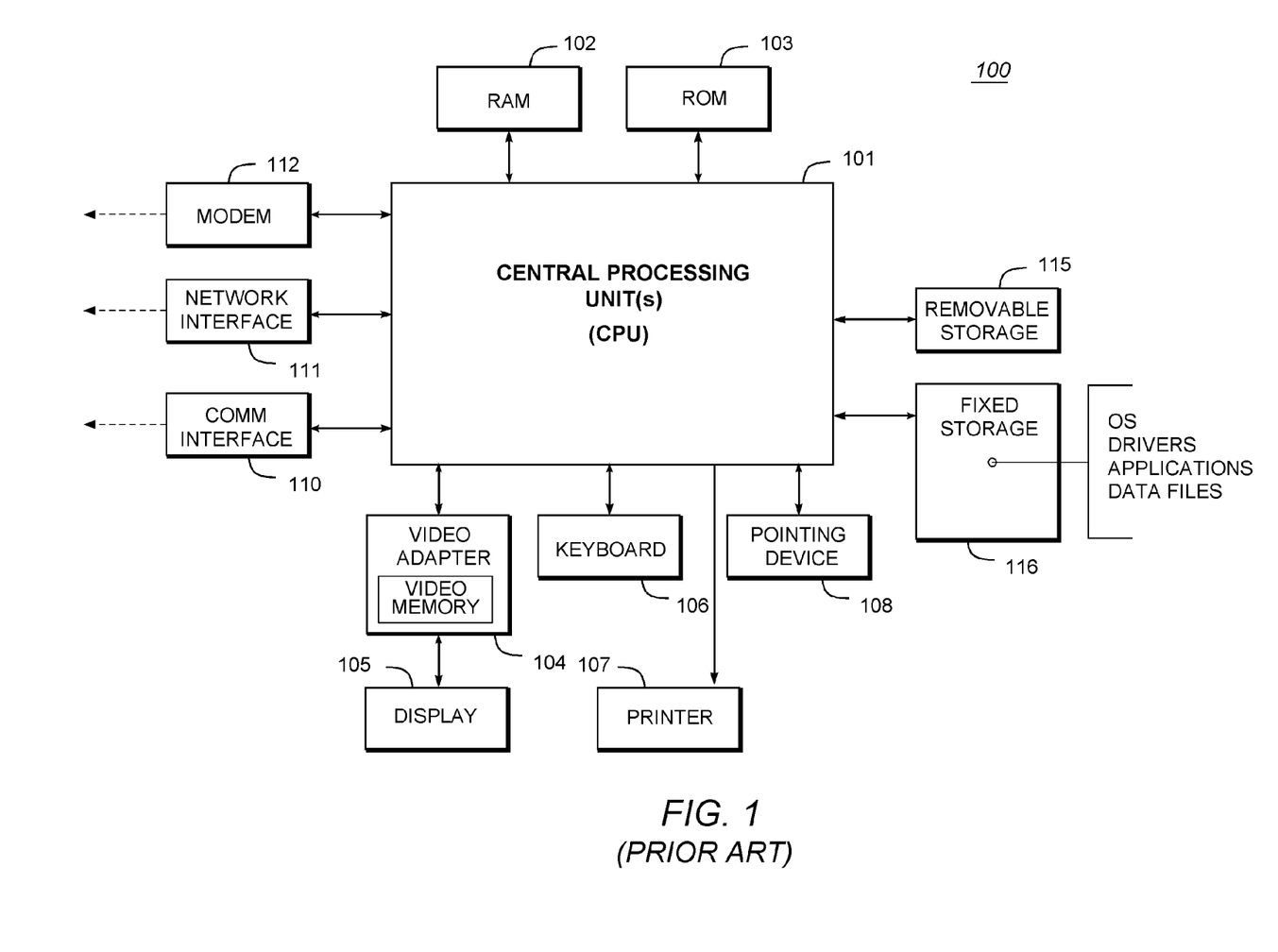
FIG. 1 is a very general block diagram of a computer system (e.g., an IBM-compatible system) in which software-implemented processes of the present invention may be embodied.

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex, Hewlett-Packard of Palo Alto, Calif., and IBM of Armonk, N.Y.

Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
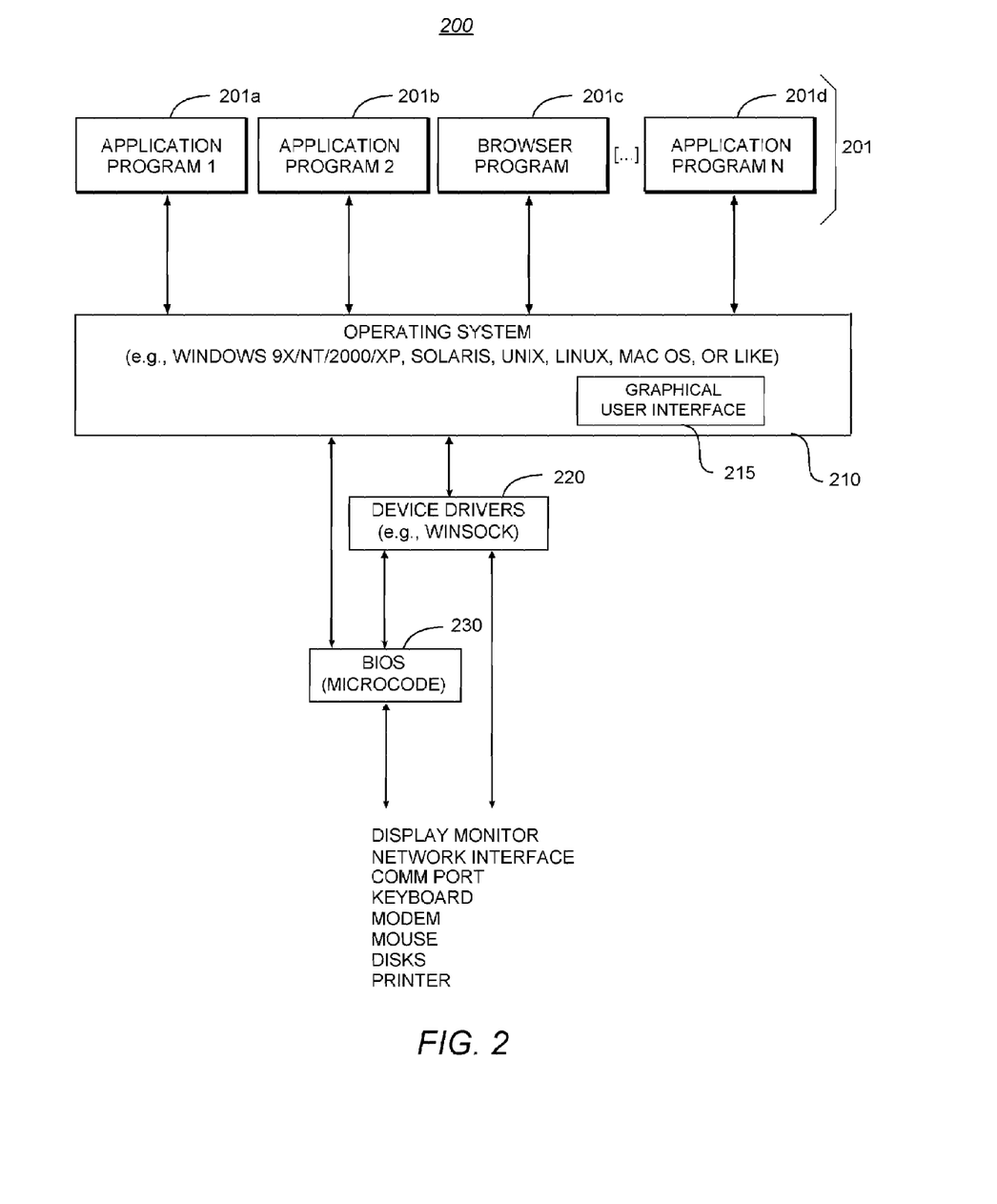
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 20c, 201d) may be "loaded" (i.e., transferred from fixed storage 116 into memory 102 ) for execution by the system 100. The applications or other software intended for use on the computer system 100 may also be stored as a set of downloadable computer-executable instructions, for example, for downloading and installation from an Internet location (e.g., Web server).

Software system 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., database server) that communicates with one or more "clients" (e.g., desktop computers, laptop computers, Web servers, and/or application servers). The following description will also present examples of a Java programming language implementation. The present invention, however, does not require the use of the Java programming language. The present invention is not limited to any particular environment or device configuration. In particular, a client/server distinction and use of the Java programming language are not necessary to the invention, but are used to provide a framework for discussion. Instead, the present invention may be implemented in any type of system architecture or processing environment capable of supporting the methodologies of the present invention presented in detail below.

Overview of Methodology for Fast Cloning of Prepared Statements

The present invention comprises a system providing methodology for fast cloning of prepared statement objects. The methodology of the present invention for fast cloning of prepared statement objects utilizes significantly less memory compared to the prior technique of prepared statement caching. Instead of each pooled connection retaining a private cache of prepared statement objects, a single extra connection (CX) is created, and all candidate database statements are prepared as templates on that connection (but are not executed). The client-side database driver (e.g., on an application server connected to a database server) is extended with a feature enabling any connection (C) to be able to create a fast clone of an arbitrary prepared statement, the clone being tied to the connection (C). When a database statement is to be executed on connection C, the appropriate template prepared statement is selected from CX, is cloned by connection C, and is then executed against the database server.

If an application server has M number of pooled connections, and N number of distinct statements that might be executed, the memory utilization of the new approach of the present invention is proportional to N. This compares favorably to the usual prepared statement caching approach of the prior art which results in memory utilization of M×N. It also compares favorably to the memory utilization of M×L which is applicable if the approach of limiting the number of statements in the cache to "L" (which is less than N) is utilized. The methodology of the present invention for fast cloning of prepared statement objects provides at least four advantages:

1. As long as N (i.e., the number of distinct statements) is not too large, all statements need to be prepared only once. The maximum benefit of reduction in client process and database server CPU utilization can be achieved, subject to the cloning operation being suitably "fast".

2. If N is less than M×L, the client process will benefit from lower memory utilization as compared with the usual approach of limiting the size of the prepared statement cache. More memory remains available for other performance optimizations.

3. In a garbage collected environment, such as a Java virtual machine environment, the reduced memory utilization can also reduce the CPU time required for full garbage collection, or reduce the time for generational scavenging of the older heap generations with an incremental garbage collector. It also reduces the number of medium-lifetime objects that get tenured into intermediate regions of the heap (which generally consume more CPU for garbage collection as compared with short-lived clones).

4. The methodology of the present invention also enables other optimizations which benefit from large values of N (i.e., large numbers of distinct statements), such as optimized statement batching, that would not be feasible under the usual prior art prepared statement caching approach.

In summary, the methodology of the present invention can simultaneously reduce both CPU and memory utilization within the database client process, as compared with the usual prepared statement caching approach, and can achieve close to the maximum reduction in client process and database server CPU utilization that is possible utilizing re-usable prepared statements. The system and methodology of the present invention is particularly useful in providing high-performance database access from multi-threaded client processes using database connection pools (e.g., Web servers and other application servers).

System Components

Three-Tier System Environment

Figure 3:
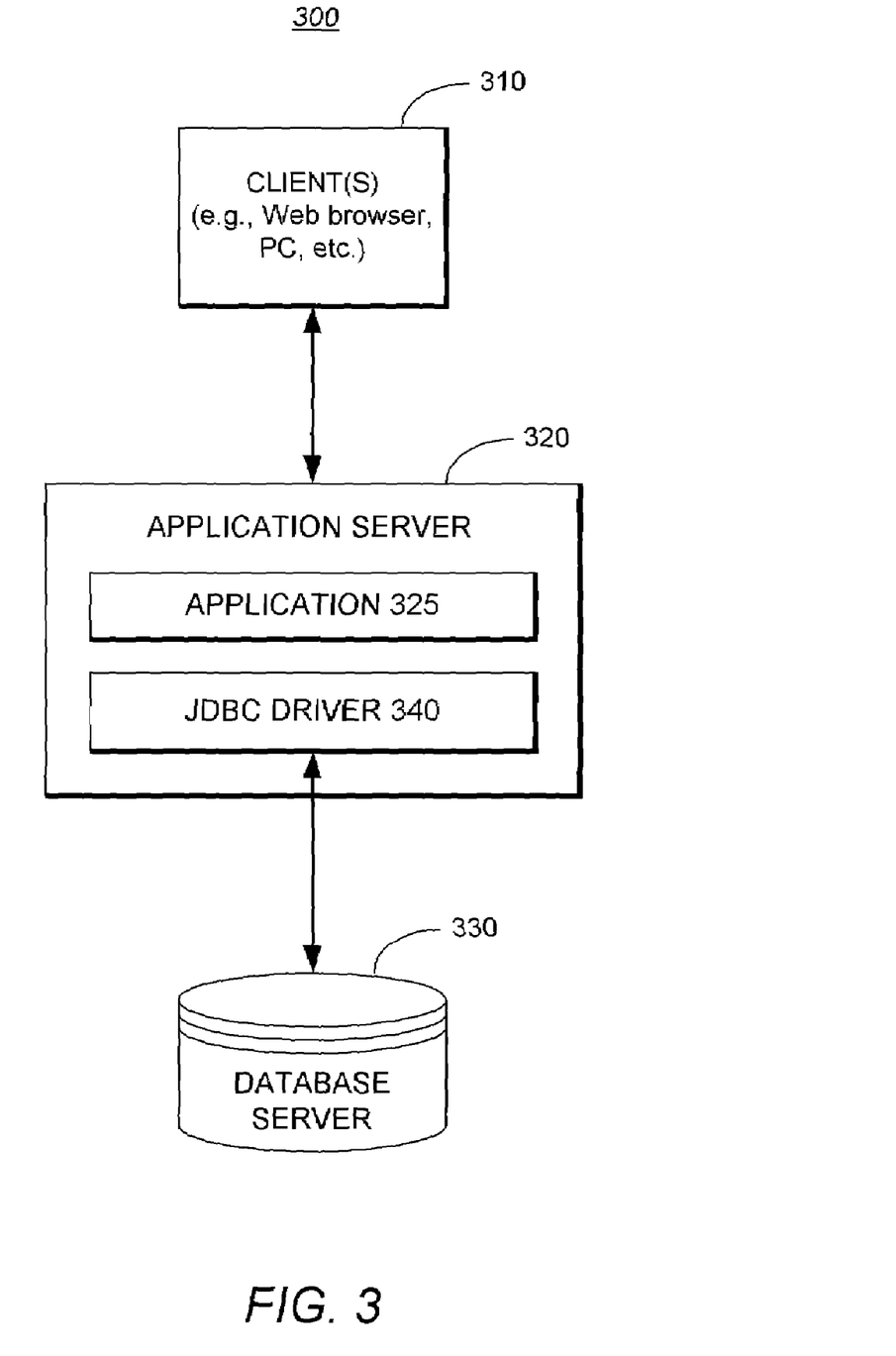
FIG. 3 is a block diagram illustrating a three-tier client/server system environment in which the present invention may be implemented.

FIG. 3 is a block diagram illustrating a three-tier client/server system environment 300 in which the present invention may be implemented. As shown at a high level, the three-tier system environment 300 includes one or more client(s) 310 (e.g., browser clients), an application server (or Web server) 320, and a back-end database server 330. The client(s) 310 may interact with an application 325 running on the application server 320. The application 325 includes the business logic of interest (i.e., of interest to the client) for performing particular tasks. For example, a particular application component may include a "GetAddress( )" method for determining an employee's address. The "GetAddress( )" method itself may include a JDBC call for fetching employee information (e.g., row(s) from an Employee table) from the database server 330.

The task of invoking the database server 330 via the JDBC call occurs within one or more threads that are executing at the application server 320. As shown, the threads executing at the application server 320 include a JDBC (driver) thread 340 for connecting to the database server 330. The JDBC driver 340 may, for example, comprise a Sybase® JConnect™ JDBC driver (available from Sybase, Inc. of Dublin, Calif.). The JConnect JDBC driver is an implementation of the JDBC API for accessing a database server from the Java programming language. During run-time execution of the foregoing JDBC call, a database connection is established (e.g., an idle connection obtained from a connection pool) between the application server 320 and the database server 330. After the database server performs corresponding authentication (if appropriate), the required results (e.g., qualifying rows) are fetched from the database server 330 and returned to the application server 320, which, in turn, returns results back to the client(s) 310. Before describing an implementation of the present invention in a three-tier client/server system environment, the architecture of a prior art solution will be described.

Architecture of Prior Art Systems

Figure 4:
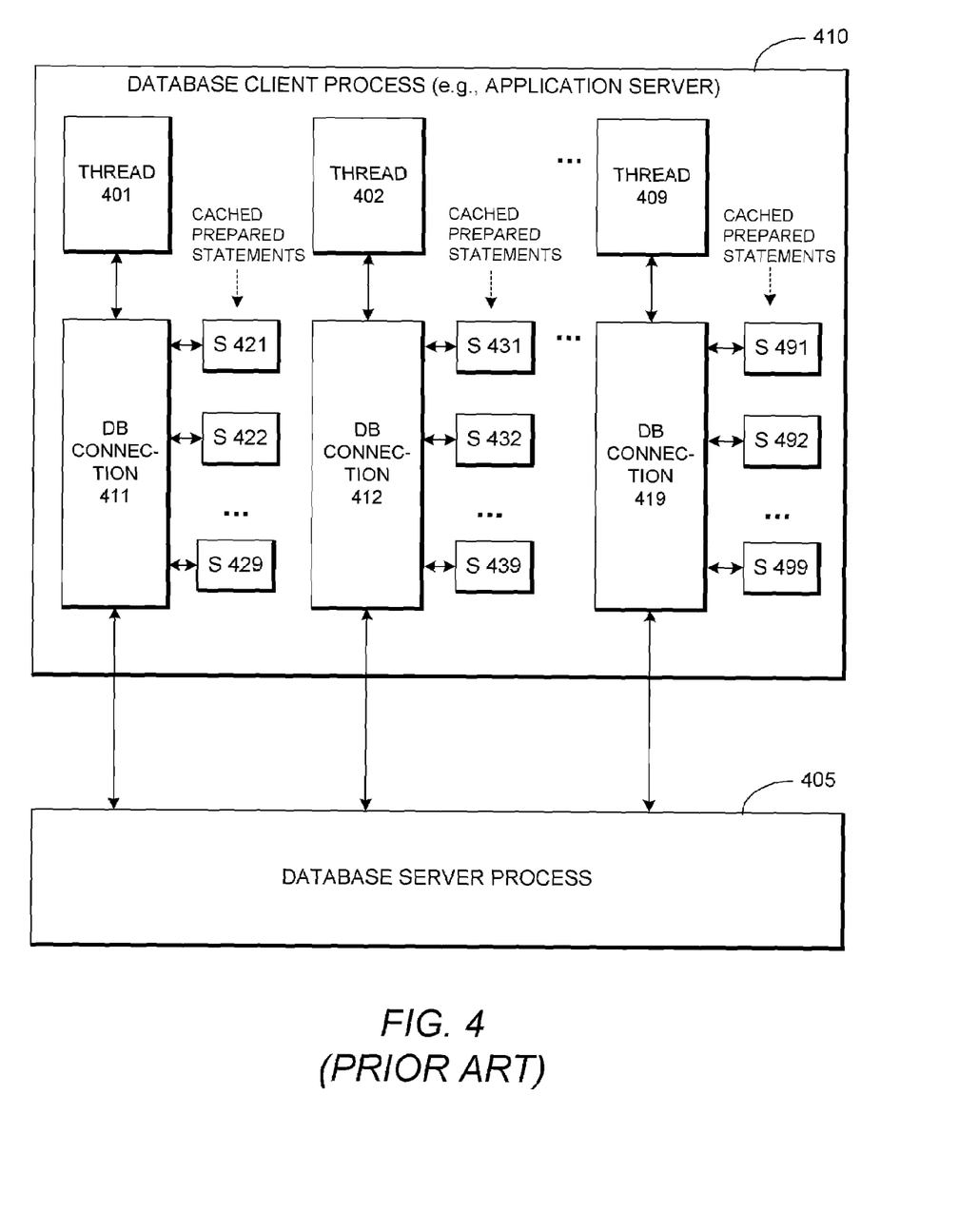
FIG. 4 illustrates the architecture of a prior art system utilizing a traditional prepared statement cache approach.

FIG. 4 illustrates the architecture of a prior art system utilizing a traditional prepared statement cache approach. As shown, a database client process (application server) 410 connected to a database server process 405 may have a plurality of threads, including threads 401, 402, and 409. Each of these threads has an associated database connection. As shown, database connections 411, 412, and 419 provide each thread with connectivity to database server process 405. With the prior art prepared statement cache approach, each ordinary database connection within the database client process 410 must retain its own cache of prepared statements. As shown, database connection 411 has a cache containing prepared statements 421, 422, and 429. Similarly, database connection 412 has a cache containing prepared statements 431, 432, and 439. This continues in a similar manner through connection 419 which has prepared statements 491, 492, and 499 in cache.

For instance, if there are a total of 9 database connections, and 9 statements that could be executed, the maximum number of cached prepared statements is equal to 81 (9×9). As previously described, a common variant of prior art systems is to define a limit on the number of statements to be cached (i.e., the cache can be limited to L statements (where L<N). For example the limit L may be set to 3 and in this event at most 3 prepared statements may be retained in each connection's statement cache. If this variant approach is used, the maximum number of cached prepared statements for the 9 connections is equal to 27 (9×3).

Architecture of System Utilizing Present Invention

Figure 5:
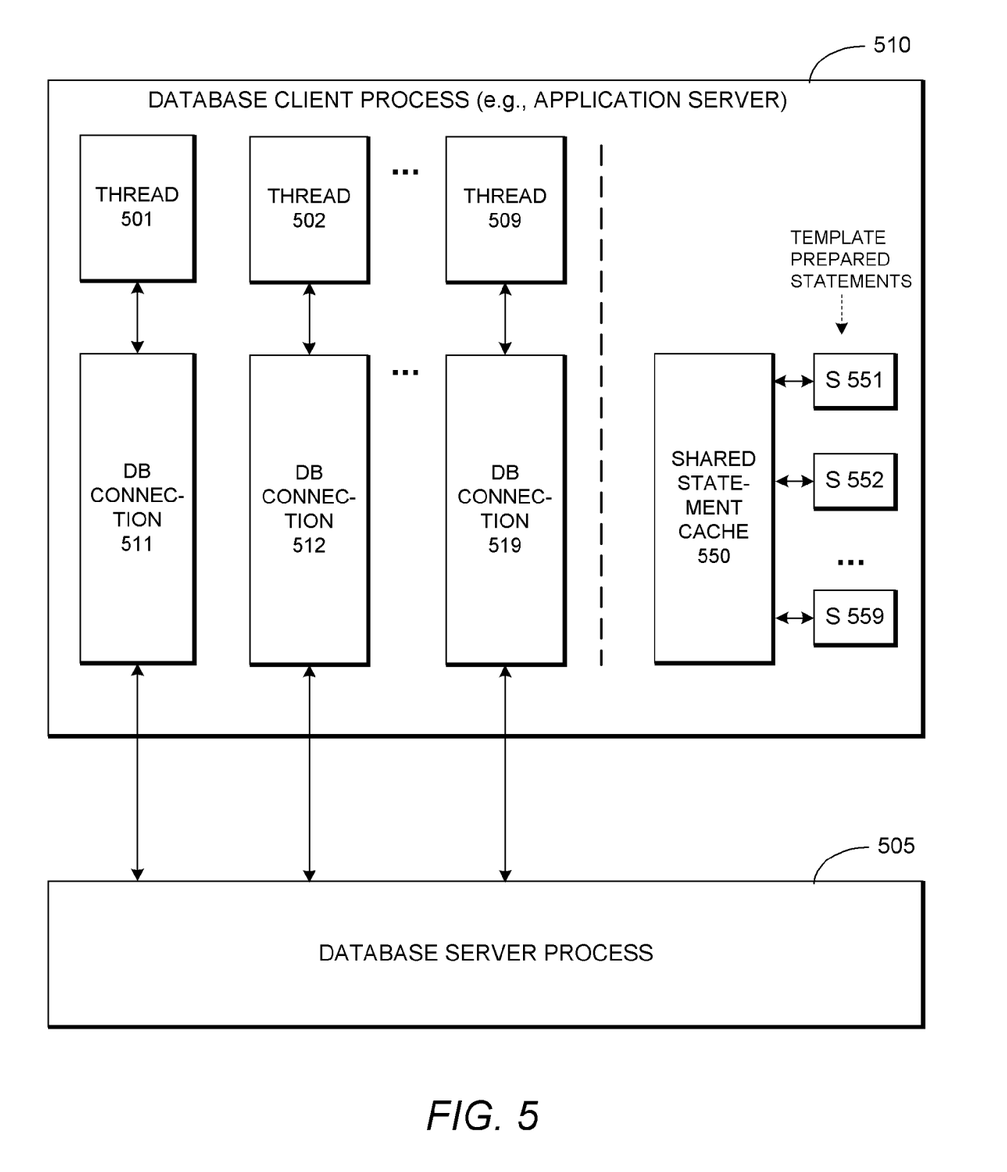
FIG. 5 illustrates the architecture of a system constructed in accordance with the present invention providing for fast cloning of prepared statements.

FIG. 5 illustrates the architecture of a system constructed in accordance with the present invention providing for fast cloning of prepared statements. As shown, a database client process (application server) 510 connected to a database server process 505 may have several threads, including threads 501, 502, and 509. As with the prior art system previously shown, each of these threads has an associated database connection. As shown, database connections 511, 512, and 519 provide threads 501, 502, and 509, respectively, with connectivity to database server process 505. However in this case a shared statement cache 550 is used within the database client process 510 to hold template prepared statements, including template prepared statements 551, 552, and 559.

The shared statement cache 550 has at most one template prepared statement for each unique database statement that is to be executed. In addition, the shared statement cache 550 of template prepared statements does not need to be pre-populated, as it can be populated with a template prepared statement the first time any given statement is to be executed. It can be seen that the maximum number of cached prepared statements with the present invention is equal to (or less than) the maximum number of prepared statements that may be executed against the database server process 505. For example, if there are a total of 9 prepared statements and 9 connections, then only 9 prepared statements would need to be cached. In contrast, a total of 81 were required in the prior art system having 9 connections and 9 prepared statements.

One benefit of the methodology of the present invention is a reduction of the memory that is taken up by cached prepared statements. The benefit is seen whenever the number of prepared statements (N) is less than the number of connections (M) multiplied by N. In other words, less memory is required whenever M (i.e., the number of connections) is greater than one.

When comparing the present invention with the common variant of the prior art that places a limit L on the size of each connection's statement cache, the memory reduction benefit is seen whenever N<M×L, that is whenever M>N/L. In this common case, a second benefit is seen with the present invention. This second benefit is reduced CPU utilization due to greater cache effectiveness, since if L<N, the common variant of prior art will discard some prepared statements from cache, thereby resulting in subsequent cache misses.

The reduced memory utilization of the present invention also provides a number of follow-on benefits including the following:

1. In a garbage-collected environment, such as a Java virtual machine environment, the method of the present invention facilitates a reduction of the CPU time required for full garbage collection. In addition, when using an incremental garbage collector, the method enables a reduction of the CPU time for generational scavenging of the older heap generations.

2. The methodology of the present invention also facilitates other optimizations which benefit from large values of N (i.e., large numbers of prepared statements), such as optimized statement batching, that would not be feasible under the prepared statement caching approach of the prior art.

DETAILED OPERATION

Methods of Operation in Executing a Statement on a Database Connection

Figure 6:
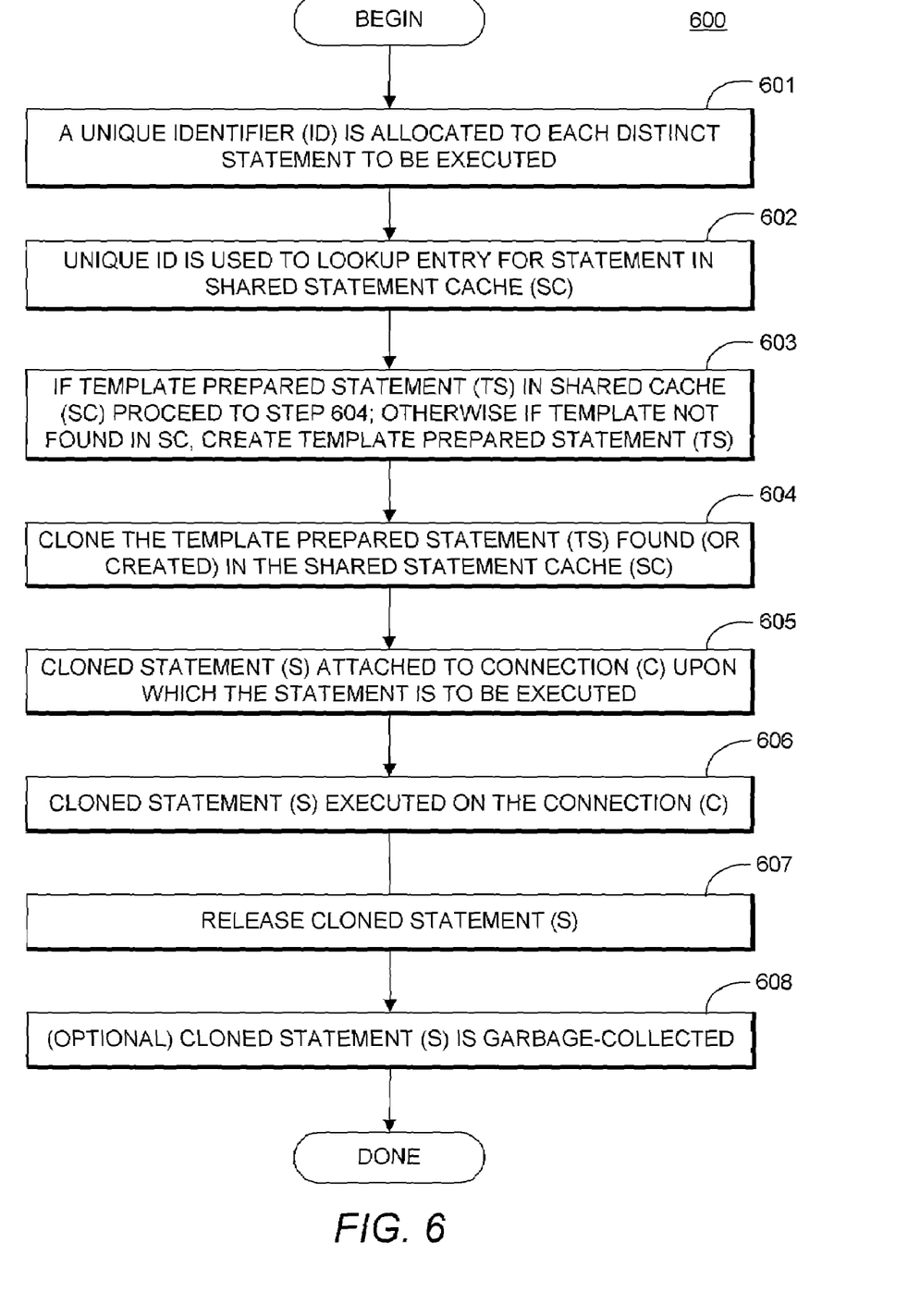
FIG. 6 is a flowchart illustrating the methods of operation of the present invention in executing a statement on a database connection.

FIG. 6 is a flowchart 600 illustrating the methods of operation of the present invention in executing a statement on a database connection. The following description presents method steps that may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server).

When a statement is to be executed (submitted to the database server) on a given database connection (e.g., from an application server to a database server process), a unique identifier (unique ID) is utilized. At step 601, the client process (e.g., at an application server) is responsible for allocating a unique ID for each distinct statement to be executed. In the currently preferred embodiment, the preferred type of unique ID assigned to a statement is a non-negative integer.

At step 602, the statement's unique ID is used to lookup an entry for the statement in the shared statement cache (SC). In the presently preferred embodiment, the shared statement cache (SC) is implemented as an array of template prepared statements, indexed by unique ID. A simple array is used as it provides a fast mechanism for looking up elements using the index. Hash tables or other data structures could also be used to implement the shared statement cache, as desired. Additionally, thread-safe synchronization of access to the shared statement cache is required if the cache is not pre-populated with prepared statements before being used to execute statements. This can be achieved using standard thread-synchronization primitives (i.e., semaphores).

If the template prepared statement (TS) exists in the shared cache, the method proceeds to step 604. However, if no template prepared statement can be found in the shared statement cache, at step 603 a new template prepared statement (TS) is created and placed into the shared statement cache. It should be noted that the template prepared statement itself is not executed. Rather, the methodology of the present invention provides for cloning the template (as described below) each time it is to be executed.

It should also be noted that in the presently preferred embodiment, the above steps 601, 602, 603 are generally performed by the client process (e.g., at the application server or directly by a multi-threaded client). Access to the shared statement cache must be properly synchronized between the client threads that are accessing the shared statement cache. This thread synchronization should be appropriately handled in the case of an application server environment as well as with an implementation involving a multi-threaded client connecting directly to the database server. The application server or client is also responsible for keeping track of all of the prepared statements that are to be used.

Once a template prepared statement (TS) is located (or created) in the shared statement cache, at step 604 the template prepared statement is cloned. Essential to the effectiveness of the current invention is that the cloning operation be suitably fast. If a prepared statement is considered as a tree data structure, then the fast cloning operation is a matter of duplicating all mutable nodes in the tree, where a mutable node is defined as a node with mutable fields, or with mutable child nodes. It should be noted that when implementing the current invention, it is advisable to apply a refactoring of code to increase, where possible, the proportion of immutable sub-structures (or sub-trees) within the prepared statement tree data structure. As described below, the methodology of the present invention provides that only a portion of the prepared statement tree structure is duplicated. More particularly, the nodes of the tree that can be changed (i.e., have mutable fields or mutable child nodes) are not shared and need to be duplicated. However, the immutable sub-structures or sub-trees within the tree structure can be "shared" to facilitate fast cloning of the template prepared statements. In fact, in many cases only the root and a small number of branches must be duplicated, while many of the other branches and leaves representing immutable portions of the tree structure are shared.

After the template prepared statement is cloned, at step 605 the cloned prepared statement (S) is attached to the connection (C) upon which the statement is to be executed. In the presently preferred embodiment, steps 604, 605 are implemented as part of the JConnect JDBC driver. In a three-tier environment, the JDBC driver operates to provide the application server with access to data at the database server. Alternatively, the JDBC driver can be implemented to provide data access directly at a client (e.g., a multi-threaded client) in the case of a two-tier client/server implementation. In the presently preferred embodiment of the present invention, the JConnect JDBC driver is modified to implement the methodology of the present invention for fast cloning of prepared statement objects as described herein. However, those skilled in the art will appreciate that Java and JDBC are used as an example to illustrate the operations of the invention. The invention may also be implemented in various other environments, including, for example, a C++ environment or a Microsoft .NET environment.

The approach of the present invention provides for retaining only one copy of each template prepared statement in cache. The appropriate template prepared statement is cloned each time a template is to be used. Because the methodology of the present invention provides for fast cloning of the template prepared statements, this approach has been demonstrated to be more efficient in terms of both memory and CPU utilization than the prior art approach of maintaining copies of each template in cache for each connection. The operations of the system of the present invention in fast cloning of a template prepared statement object and attaching the cloned prepared statement to the connection are described in more detail below in this document.

After the template prepared statement is cloned and attached to the connection, at step 606 the cloned statement (S) is executed on the connection. Results may (or may not) be returned to the client as a result of executing the cloned statement (S). For example, the cloned statement (S) may comprise a database query statement which causes the return of results to the client database process. Alternatively, the cloned statement (S) may comprise a statement (e.g., a SQL UPDATE statement) which does not have results.

After the cloned statement (S) is executed on the connection, at step 607 the cloned statement is released. Optionally, at step 608 the statement may also be garbage collected after it is released in the case of an environment providing for garbage collection. In a garbage collected system (e.g., a Java virtual machine environment), all references to the cloned statement (S) generally must be set to null to allow the cloned statement to be garbage collected. The operations of the system of the present invention in cloning prepared statements (which also includes "callable" statements) and attaching the cloned prepared statements to a connection will now be described in greater detail.

Shared Cache

The following "SybConnection" class includes methods for cloning prepared statements ("Prepared Statements") and callable statements ("Callable Statements") in order to make prepared or callable statements on one connection available for use on other connections:

```
 1: package com.sybase.jdbc2.jdbc;
 2:
 3: // ...
 4:
 5: public class SybConnection implements
        com.sybase.jdbcx.SybConnection
 6: {
 7:    // ...
 8:
 9:    private ProtocolContext__sharedPc;
10:    private CacheManager__sharedCm;
11:
12:    // ...
13:
14:    /**
15:    ** Use this method to create a light-weight copy of a
16:    ** Prepared Statement that may have been created
       on a
17:    ** different connection
18:    ** Originally intended as an internal hook for use by
19:    ** application server driver wrapper to implement a
20:    ** prepared statement cache with very low memory
       and
       CPU requirements.
21:    **/
22:    public com.sybase.jdbcx.SybPreparedStatement
        copyPreparedStatement
23:       (com.sybase.jdbcx.SybPreparedStatement stmt) throws
        SQLException
24:    {
25:       return (com.sybase.jdbcx.SybPreparedStatement)
26:          (new SybPreparedStatementCopy
        (getSharedProtocolContext( ),
27:          (com.sybase.jdbc2.jdbc.SybPreparedStatement)
        stmt));
28:    }
29:
30:    /**
31:    ** Use this method to create a light-weight copy of a
32:    ** CallableStatement that may have been created on a
33:    **different connection.
34:    ** Originally intended as an internal hook for use by
35:    ** application server driver wrapper to implement a
36:    ** prepared statement cache with very low memory
       and
       CPU requirements.
37:    **/
38:    public com.sybase.jdbcx.SybCallableStatement
        copyCallableStatement
39:       (com.sybase.jdbcx.SybCallableStatement stmt) throws
        SQLException
40:    {
41:       return (com.sybase.jdbcx.SybCallableStatement)
42:          (new SybCallableStatementCopy
        (getSharedProtocolContext( ),
43:          (com.sybase.jdbc2.jdbc.SybCallableStatement)
        stmt));
44:    }
45:
46:    /**
47:    ** Get the shared ProtocolContext.
48:    ** MUST be used only by Syb(Prepared/Callable)Statement
       Copy.
49:    **/
50:    protected synchronized ProtocolContext
        getSharedProtocolContext( )
51:       throws SQLException
52:    {
53:       if (__sharedPc == null)
54:       {
55:          __sharedPc = initProtocol( );
56:       }
57:       return __sharedPc;
58:    }
59:
60:    /**
```

```
-continued
61:    ** Get the shared Cache Manager.
62:    ** MUST be used only by Syb(Prepared/Callable)Statement
       Copy.
63:    **/
64:    protected synchronized CacheManager
       getSharedCacheManager( )
65:    {
66:        return _sharedCm;
67:    }
68:
69:    /**
70:    ** Set the shared CacheManager.
71:    ** MUST be used only by Syb(Prepared/Callable)Statement
       Copy.
72:    **/
73:    protected synchronized void setSharedCacheManager
       (CacheManager cm)
74:    {
75:        _sharedCm = cm;
76:    }
77: }
```

Initially, it should be noted that although the above description of the invention describes cloning a template prepared statement and attaching the cloned statement to a connection as two separate conceptual steps, in the presently preferred implementation these steps have been merged. As shown above, the method signature of the "copyPreparedStatement" method illustrated at lines 22–23 provides for cloning a prepared statement and attaching the cloned statement to a database connection. As shown at line 23, the parameter that is passed into the method is a template prepared statement ("SybPreparedStatement stmt") that is to be cloned and attached to the connection.

A similar "copyCallableStatement" method commences at line 38. The JDBC API provides for two types of prepared statements which are referred to as "Prepared Statements" and "Callable Statements". Both of these types of prepared statements are handled similarly for purposes of implementing the methodology of the present invention. Although the following discussion will focus on Prepared Statements, a similar process also applies for cloning Callable Statements.

At line 26, (and line 42 in the case of a Callable Statement), when a new Prepared Statement is being cloned, the first parameter passed into this method is "getShared-ProtocolContext( )". This provides information about a portion of the Prepared Statement that can be shared and does not need to be duplicated (copied) by the "copyPreparedStatement" method. The "SharedProtocolContext" is common for all statements on any given connection. The sharing of this information enables the cloning of the Prepared Statement to be performed more quickly. Essentially, "hints" are provided about information (e.g., branches or nodes of the tree to use the tree structure analogy) that can be shared, thereby avoiding the need to duplicate the information. As shown at lines 50-58, the "getSharedProtocolContext( )" method returns the shared Protocol Context ("_sharedPc"), creating it if necessary (i.e., creating it if "_sharedpc" is null at line 53). It should be noted that the need for a protocol context is a JConnect-specific requirement (e.g., one that may not apply for another JDBC implementation) that is not essential to the operation of the invention. However, this code does demonstrate the fast cloning methodology of the present invention in which immutable portions of the statement (e.g., immutable sub-trees) that can be shared are identified and used in order to increase the speed of the cloning operation.

A similar optimization is shown above at line 64 with the "getSharedCacheManager( )" method which is also called to facilitate faster cloning. (Note that this shared Cache Manager should be distinguished from the shared statement cache described in earlier portions of this document). Essentially, this shared Cache Manager is another "shareable" sub-tree that can reduce the number of nodes that must be duplicated during the process of cloning a prepared statement and attaching it to a connection.

Prepared Statement Constructor

The following "SybPreparedStatement" class contains a constructor which is called by the below "SybPreparedStatementCopy" class:

```
 1: package com.sybase.jdbc2.jdbc;
 2:
 3: // ...
 4:
 5: public class SybPreparedStatement extends SybStatement
 6:     implements com.sybase.jdbcx.SybPreparedStatement
 7: {
 8:     // ...
 9:
10:     // another constructor for use by SybPreparedStatement
        Copy.
11:     // This avoids unnecessary re-parsing of the query
        string,
12:     // and instead clones the necessary non-immutable
        sub-objects.
13:     SybPreparedStatement(ProtocolContext pc, SybPrepared
        Statement
        copyFrom)
14:         throws SQLException
15:     {
16:         super(pc);
17:         _query = copyFrom._query;
18:         if (Const.DEBUG) Debug.println(this, "Constructor
            ("" +
            _query + "")");
19:         _paramMgr = new ParamManager(copyFrom._paramMgr,
            this);
20:     }
21: }
```

The above method illustrates both the sharing of a portion of the template Prepared Statement as well as the duplication of a portion that cannot be shared (e.g., because it is mutable). In particular, at line 17 the above method provides for sharing an object referred to as a "query". In this case the "copyFrom" is the template and the "query" object is shared from the template. In contrast, at line 19, the parameter manager ("ParamManager") is a type of object that is mutable and therefore cannot be shared. Accordingly, at line 19, a new "ParamManager" object is created. In this case the template's object ("copyFrom._paramMgr") is copied to create the cloned object for inclusion as part of the cloned Prepared Statement. However, it should be noted that portions of the "ParamManager" object may be shared as illustrated in the below "ParamManager" class.

Callable Statement Constructor

The following "SybCallableStatement" class extends the "SybPreparedStatement" class to provide a constructor used by the below "SybCallableStatementCopy" subclass.

```
1: package com.sybase.jdbc2.jdbc;
2:
3: // ...
4:
```

-continued

```
 5: public class SybCallableStatement extends SybPrepared
    Statement
 6:     implements com.sybase.jdbcx.SybCallableStatement
 7: {
 8:     // ...
 9:
10:     // another constructor which is used only by the
        SybCallableStatementCopy
11:     // subclass. This constructor avoids unnecessary reparsing
        of
12:     // the query string, and instead clones the necessary
        non-immutable sub-objects.
13:     SybCallableStatement(ProtocolContext pc,
        SybCallableStatement copyFrom)
14:         throws SQLException
15:     {
16:         super(pc, copyFrom);
17:         if (Const.DEBUG) Debug.println(this, "Constructor
            ("' +
            __query + "')");
18:         __allowsOutputParms = copyFrom.__allowsOutputParms;
19:         __rpcName = copyFrom.__rpcName;
20:         __hasReturn = copyFrom.__hasReturn;
21:         if (__hasReturn)
22:         {
23:             __paramMgr.setParam(1, Param.STATUS__RETURN,
            new
            Integer(0), 0);
24:             __paramMgr.registerParam(1, Types.INTEGER, 0);
25:             __returnHasBeenRegistered = false;
26:         }
27:     }
28: }
```

The above constructor is used by the below "SybCallableStatementCopy" subclass. The constructor avoids unnecessary re-parsing of the query string, and instead clones the necessary non-immutable sub-objects of a Callable Statement. A Callable Statement is a variant of a Prepared Statement and the cloning process is performed in a similar fashion as with other Prepared Statements as described herein.

Parameter Manager Constructor

The following "ParamManager" class contains a constructor which uses a "template" statement to initialize a "ParamManager" to be used by the light-weight statement copy:

```
 1: package com.sybase.jdbc2.jdbc;
 2:
 3: // ...
 4: public class ParamManager implements Cacheable
 5: {
 6:     // ...
 7:
 8:     // Constructor for light-weight copy.
 9:     public ParamManager(ParamManager copyFrom, SybStatement
        stmt)
10:         throws SQLException
11:     {
12:         __next = -1;
13:         __last = -1;
14:         __maxOutParam = -1;
15:         __stmt = stmt;
16:         __context = stmt.__context;
17:         __stmtMgr = stmt.__statementManager;
18:         __protocol = __context.__protocol;
19:         int numParams = copyFrom.__params.length;
20:         __params = __protocol.paramArray(__context, numParams);
21:         for (int i = 0; i < numParams; i++)
22:         {
```

-continued

```
23:             __params[i].__paramMarkerOffset =
            copyFrom.__params[i].__paramMarkerOffset;
24:         }
25:         __mgr = __context.__conn.getSharedCacheManager( );
26:         if (__mgr == null)
27:         {
28:             __mgr = new CacheManager(__context.__is);
29:             boolean reReadable =
            __context.__conn.__props.getBoolean(SybProperty.REPEAT__READ);
30:             __mgr.setReReadable(reReadable);
31:             int cacheSize =
            __context.__conn.props.getInteger(SybProperty.STREAM__CACHE__
            SIZE);
32:             if (reReadable)
33:             {
34:                 cacheSize = CacheManager.INFINITE__CACHING;
35:             }
36:             __mgr.setCacheSize(cacheSize);
37:             // max column size
38:             __mgr.setChunkSize(Const.COLUMN__CHUNK__SIZE);
39:             __mgr.setAbortOnCacheOverflow(true);
40:             __context.__conn.setSharedCacheManager(__mgr);
            // register for re-use
41:         }
42:         if (copyFrom.__templateHoldsParsedNoLiteralQuery)
43:         {
44:             __hasLiteralParam = copyFrom.__hasLiteralParam;
45:             __savedParsedQuery = copyFrom.__savedParsed
            Query;
46:             __paramMarkersHaveBeenParsed = true;
47:         }
48:         __copiedFrom = copyFrom;
49:     }
50: }
```

As illustrated above at line 9, a first parameter ("ParamManager copyFrom") of the "ParamManager" method represents the template that is being cloned (i.e., copied from). A second parameter ("SybStatement stmt") is the new statement that is being created. The code commencing at line 20 illustrates a portion of the new cloned statement that is generated by creating a new "paramArray" and then running through elements of the array and copying certain information from the template. Although a new portion is being created, as shown at line 23, some information from the template is reused. In this case, information that has already been calculated is reused, thereby avoiding another calculation to generate the same information. The methodology of the present invention provides for reusing information whenever possible during cloning in order to streamline the cloning process and reduce CPU and memory utilization.

At line 25, the connection is asked for one of its branches so that this branch, if it exists, may be shared in generating the cloned statement. A check is made at line 26 to determine if the branch exists ("if (_mgr==null)"). If the branch does not exist, then the branch is created and used as provided at lines 27–41. Lines 42–48 illustrate another optimization in which branches or available information are reused. Some of the nodes of the template Prepared Statement tree represent values that can be reused to avoid having to recalculate these values. In other cases nodes may represent pointers to information that does not change (i.e., is immutable) and therefore does not need to be duplicated. The above examples illustrate the manner in which a template Prepared Statement is efficiently and quickly cloned using a combination of sharing and duplication. The methodology of the present invention provides for duplicating (copying) the minimum portion necessary (i.e., the mutable portion that independent threads may wish to separately change) and to reuse other portions that can be shared (i.e., the immutable portions). As previously noted, refactoring is also recommended to increase the number of immutable sub-objects that can be reused, thereby increasing the efficiency of the cloning process. For example, the shared Cache Manager and the shared Protocol Context described above were introduced as part of a refactoring of a "SybConnection" class to reduce the quantity of items that need to be duplicated as part of the prepared statement cloning operation.

Copying Prepared Statement

The following "SybPreparedStatementCopy" class of the currently preferred embodiment creates a light-weight copy of a prepared statement ("Prepared Statement") that may have been created on a different connection:

```
 1: package com.sybase.jdbc2.jdbc;
 2: import com.sybase.jdbc2.utils.Debug;
 3: import java.sql.*;
 4: import java.io.IOException;
 5:
 6: /**
 7:  * This class provides a light-weight way to share prepared
 8:  * statements across connections. Use the
 9:  * <PRE>
10:  * public SybPreparedStatement SybConnection.copyPrepared
          Statement
11:  * (SybPreparedStatement stmt)
12:  * </PRE>
13:  * Sybase extension to create these objects. That method
         produces a
14:  * SybPreparedStatement that is equivalent to the original
         one
15:  * except that it is attached to the provided connection.
         The
16:  * copying process is accelerated by the use of a "shared"
         ProtocolContext from that connection.
17:  * <P>These shared prepared statement objects should
         only be used
18:  * 1-at-a-time on a connection, and you should always
         call the
19:  * close( ) method immediately after executing them.
20:  * @see SybConnection.getSharedProtocolContext
21:  * @see SybConnection.copyPreparedStatement
22:  */
23:
24: public class SybPreparedStatementCopy extends SybPrepared
        Statement
25: {
26:    // Constructors
27:    SybPreparedStatementCopy(ProtocolContext pc,
       SybPreparedStatement copyFrom)
28:      throws SQLException
29:    {
30:      //* DONE
31:      super(pc, copyFrom);
32:    }
33:
34:    // A secret method to allow a statement/resultset/etc
       have
35:    // a utility statement on the same context.
36:    // Note that this method is called only by TdsCursor
       for
37:    // language cursor processing. Since the *Statement
       Copy
38:    // classes are not to be used with cursors (we mention
       this
39:    // in the javadocs), this method should not be called.
40:    public void switchContext(ProtocolContext pc)
41:    {
42:      if (Const.ASSERT) Debug.assert(this, false);
43:    }
44:
45:    // override the close method to make sure we retain
       the shared
       context
46:    public void close( ) throws SQLException
47:    {
48:      //* DONE
49:      close (false);
50:    }
51: }
```

The above "SybPreparedStatementCopy" class is a subclass that extends the "SybPreparedStatement" class. A considerable portion of the cloning logic is actually implemented in the superclass. This enables the same code to be used for both Prepared Statements and Callable Statements as both inherit from the "SybPreparedStatement" class. As a result, the "SyPrepareStatementCopy" class itself is straightforward.

The system of the present invention, in its currently preferred embodiment, performs some internal optimizations to implement this copying (cloning) method, which lead to the following conditions which should be followed when using the above "SybPreparedStatement Copy" method:

The "template" Prepared Statement should be created as a client would typically create any Prepared Statement, but the template should not be executed.

In the presently preferred embodiment, cloned Prepared Statements (and cloned Callable Statements) must be executed one-at-a-time on the connection (i.e., database connection) to which they are copied as indicated in the comments in the above code. This means that during execution of a cloned statement, the client should not attempt to use any other cloned Prepared Statement (or cloned Callable Statement) on the same connection until the first cloned Prepared/Callable Statement has been executed to completion. Rephrasing, the cloned statement should be executed, should have its results fetched entirely (or canceled with a call to "cancel( )"), and the cloned statement should then be closed with a call to "close( )" before the next cloned statement is executed.

A JDBC driver frequently allows two statements to be created and executed on a connection by interleaving the processing of the result set. However, in the case of these cloned Prepared (and Callable) Statements, the Prepared Statement should be closed and executed on the connection to completion (including return of results) before another statement is executed on the connection. This is not necessarily required by the invention, however it is required in the presently preferred embodiment in order to enable greater sharing of items such as the above-described shared Protocol Context and the shared Cache Manager. It would not necessarily be safe to share these items if multiple statements were executed on a connection at the same time. Similarly, the above "SybPreparedStatementCopy" method should not be used in conjunction with any kind of batching (e.g., an "addBatch" method and other related methods) or to perform "cursor-type" processing of results (e.g., "ResultSets"). It should be noted that failure to observe the above restrictions may lead to data corruption in the presently preferred embodiment. Finally, it is allowable to use the "SybPreparedStatementCopy" method when using "PooledConnections".

Copying Callable Statement

The following "SybCallableStatementCopy" class of the currently preferred embodiment creates a light-weight copy of a callable statement ("Callable Statement") that may have been created on a different connection:

```
 1: package com.sybase.jdbc2.jdbc;
 2: import com.sybase.jdbc2.utils.Debug;
 3: import java.sql.*;
 4: import java.io.IOException;
 5:
 6: /**
 7:  * This class provides a light-weight way to share callable
 8:  * statements across connections. Use the
 9:  * <PRE>
10:  * public SybCallableStatement SybConnection.copyCallable
     Statement
11:  *     (SybCallableStatement stmt)
12:  * </PRE>
13:  * Sybase extension to create these objects. That method
     produces a
14:  * SybCallableStatement that is equivalent to the original
     one
15:  * except that it is attached to the provided connection.
     The
16:  * copying process is accelerated by the use of a "shared"
     ProtocolContext from that connection.
17:  * <P>These shared prepared statement objects should
     only be used
18:  * 1-at-a-time on a connection, and you should always
     call the
19:  * close( ) method immediately after executing them.
20:  * @see SybConnection.getSharedProtocolContext
21:  * @see SybConnection.copyCallableStatement
22:  */
23:
24: public class SybCallableStatementCopy extends SybCallable
    Statement
25: {
26:    // Constructors
27:    SybCallableStatementCopy(ProtocolContext pc,
       SybCallableStatement copyFrom)
28:       throws SQLException
29:    {
30:       //* DONE
31:       super(pc, copyFrom);
32:    }
33:
34:    // A secret method to allow a statement/resultset/etc
       have
35:    // a utility statement on the same context.
36:    // Note that this method is called only by TdsCursor
       for
37:    // language cursor processing. Since the *Statement
       Copy
38:    // classes are not to be used with cursors (we mention
39:    // this in the javadocs), this method should not be
       called.
40:    public void switchContext(ProtocolContext pc)
41:    {
42:       if (Const.ASSERT) Debug.assert(this, false);
43:    }
44:
45:    // override the close method to make sure we retain
       the
       shared context
46:    public void close( ) throws SQLException
47:    {
48:       close (false);
49:    }
50: }
```

The above "SybCallableStatementCopy" class is also a subclass that extends the "SybCallableStatement" class. Accordingly, as with the above-described "SybPreparedStatementCopy" class, much of the cloning logic is actually implemented in the superclass. The cloning of Callable Statements is also currently subject to the same conditions described above with respect to the cloning of Prepared Statements. These conditions are as a result of some internal optimizations made to implement the cloning methodology in the currently preferred embodiment and may not be needed in another implementation.

Advantages of Fast Cloning

The above-described fast cloning methodology is particularly useful for applications that might be implementing some type of cache of M number of Prepared Statements (including Callable Statements) that are to be shared among N number of connections (e.g., database connections). Instead of having to keep M number of Prepared Statements for each of the N connections (leading to M×N Prepared Statements in memory), the cache can keep M Prepared Statements as templates and then initiate the cloning operation on the given connection for which the application wants to execute the statement. Testing has revealed that intelligent cloning in accordance with the methodology of the present invention can lead to significant performance improvements due to reduced CPU and memory usage.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

The invention claimed is:

1. A method for executing a database statement, the method comprising:
   preparing at least one template capable of generating an executable statement for execution against a database via a particular database connection;
   storing the at least one template in a shared cache at an application server so that the at least one template is available to a plurality of database connections, such that memory requirements of the shared cache are proportional to how many templates exist, regardless of how many executable statements are generated;
   in response to a request to execute a particular statement on a given database connection, determining whether a first template for the particular statement is available in the shared cache;
   if the first template is unavailable in the shared cache, preparing a second template for execution of the particular statement against the database and placing the second template in the shared cache;
   once the first template is available in the shared cache, creating a corresponding executable statement based on the first template, the executable statement having been prepared for execution on the given database connection;
   executing the executable statement on the given database connection and returning any results of executing the executable statement.

2. The method of claim 1, wherein said preparing comprises preparing a structure for execution of the database statement against a database.

3. The method of claim 2, wherein said structure comprises an executable structure for executing the database statement on a database connection.

4. The method of claim 1, wherein the request to execute a particular statement on a given database connection is received at the application server.

5. The method of claim 1, wherein the request to execute a particular statement on a given database connection is received at a database client.

6. The method of claim 1, wherein said shared cache is available via a particular database connection at the application server to application threads accessing a remote database server.

7. The method of claim 1, wherein said given database connection includes a connection allocated from a connection pool.

8. The method of claim 1, wherein said storing step includes making said shared cache available on a first database connection.

9. The method of claim 8, wherein a template in said shared cache is cloned for use on a second database connection.

10. The method of claim 1, further comprising:
assigning a unique identifier to each statement to be executed against the database.

11. The method of claim 10 wherein said determining includes using said unique identifier to determine whether a template is available in the shared cache.

12. The method of claim 10, wherein said shared cache comprises an array of templates indexed based on said unique identifier.

13. The method of claim 1, further comprising:
synchronizing access to the shared cache from application threads on a plurality of database connections.

14. The method of claim 1, wherein said creating includes reusing immutable portions of a template.

15. The method of claim 1, wherein said creating includes duplicating mutable portions of a template.

16. The method of claim 15, wherein said mutable portions include nodes of the template having mutable children.

17. The method of claim 15, wherein said mutable portions include nodes of the template having mutable fields.

18. The method of claim 1, wherein said creating includes attaching the database statement to the given database connection.

19. A computer-readable storage medium having processor-executable instructions for performing the method of claim 1.

20. The method of claim 1, further comprising: downloading a downloadable set of computer-executable instructions for performing the method.

21. A system for executing a database statement, the system comprising:
at least one template for generating an executable statement for execution against a database;
a shared cache located in a middle tier for storing the at least one template attached to a first database connection so that the at least one template is available to a plurality of database connections, such that memory requirements of said shared cache are proportional to how many templates exist, regardless of how many executable statements are generated;
a locater module for locating a first template corresponding to a particular statement in the shared cache in response to a request to execute the particular statement on a second database connection and determining whether the first template for the particular statement is available in the shared cache;
a module for preparing a second template for execution of the particular statement and placing the second template in the shared cache if the locater module determines that the first template is unavailable;
a cloning module for cloning the first template to create an executable database statement for execution once the first template is available in the shared cache and the executable database statement having been prepared for execution on the second database connection;
module for executing the executable database statement on the second database connection and returning any results of executing the executable database statement.

22. The system of claim 21, wherein said at least one template comprises at least one database prepared statement.

23. The system of claim 21, wherein said at least one template comprises at least one prepared statement in executable form for execution against a database.

24. The system of claim 21, wherein the request to execute a particular statement on a second database connection is received at an application server.

25. The system of claim 21, wherein the request to execute a particular statement on a second database connection is received at a database client.

26. The system of claim 21, wherein said shared cache is available via a particular database connection at an application server to application threads accessing a remote database server.

27. The system of claim 21, wherein said second database connection includes a connection allocated from a connection pool.

28. The system of claim 21, further comprising:
a module for assigning a unique identifier to a statement to be executed against the database.

29. The system of claim 28, wherein the locater module uses said unique identifier to determine whether a template is available in the shared cache.

30. The system of claim 28, wherein said shared cache comprises an array of templates indexed based on said unique identifier.

31. The system of claim 21, further comprising:
a module for synchronizing access to the shared cache from application threads on a plurality of database connections.

32. The system of claim 21, wherein the cloning module reuses immutable portions of a template in cloning the template.

33. The system of claim 21, wherein the cloning module duplicates mutable portions of a template in cloning the template.

34. The system of claim 33, wherein said mutable portions of a template include nodes of the template having mutable children.

35. The system of claim 33, wherein said mutable portions of a template include nodes of the template having mutable fields.

36. The system of claim 21, wherein the cloning module attaches the database statement to the second database connection.

* * * * *